C. G. Shaw,
Counter Shaft.

N° 37,525.  Patented Jan. 27, 1863.

Attest:
J. W. Coombs
Chas. A. Fiske

Inventor:
C. G. Shaw
per Munn & Co.
Attorneys

UNITED STATES PATENT OFFICE.

C. G. SHAW, OF FLORENCE, MASSACHUSETTS.

IMPROVEMENT IN COUNTER-SHAFTS.

Specification forming part of Letters Patent No. 37,525, dated January 27, 1863.

*To all whom it may concern:*

Be it known that I, C. G. SHAW, of Florence, in the county of Hampshire and State of Massachusetts, have invented a new and useful Improvement in Counter-Shafts for Driving-Machinery; and I do hereby declare that the following is a full, clear, and exact description of the same, reference being had to the accompany drawings, forming part of this specification, in which—

Figure 2:
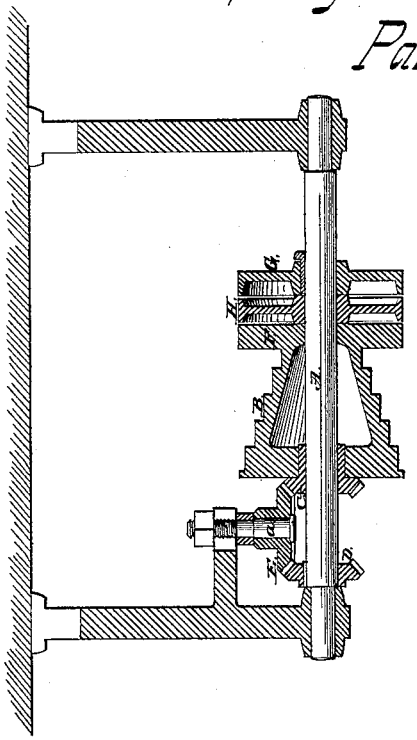
Figure 1:
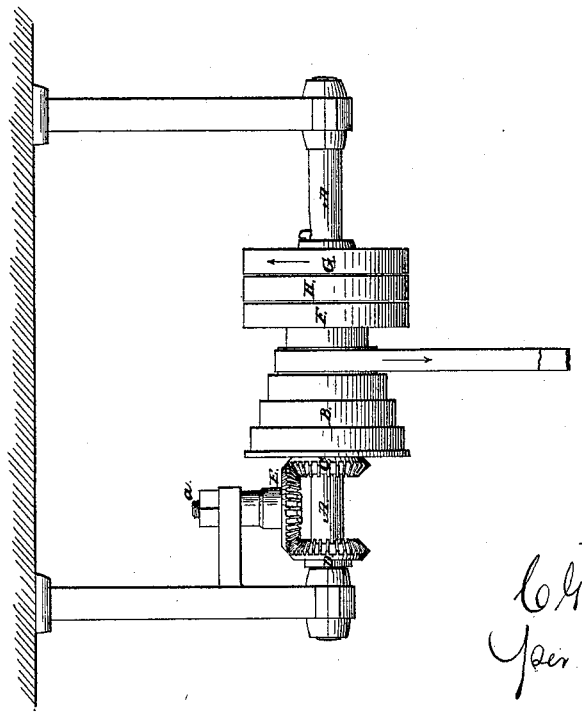

Figure 1 is an outside longitudinal view of a counter-shaft having my invention applied. Fig. 2 is a longitudinal view of the shaft, with the pulleys and gearing in section.

Similar letters of reference indicate corresponding parts in both figures.

This invention consists in combining a loose cone-pulley with a counter-shaft, upon which it is fitted by means of two bevel-gears, one of which is fast to the pulley and another fast on the shaft, and a third bevel-gear to transmit motion from one to the other of the first mentioned, whereby the loose cone-pulley and the shaft are caused to rotate in opposite directions, and a backward and forward motion of the pulley can be obtained by shifting the driving-belt to and from a pulley fast on the shaft and a pulley fast to the cone.

To enable others to make and use my invention, I will proceed to describe its construction and operation.

A is the counter-shaft, and B the cone-pulley fitted loosely thereon. C is the bevel-gear fast to the cone-pulley, and D the bevel gear fast to the shaft. E is the intermediate bevel-gear, gearing with C and D, fitted to turn freely upon a fixed stud, *a*. F and G are pulleys for receiving the motion through a belt from the driving-shaft, one fast to the cone-pulley and the other to the counter-shaft, and H is a loose pulley arranged upon the counter-shaft between F and G, and to which the belt is shifted when the motion of the counter-shaft is to be stopped.

The bevel-gearing causes the shaft and the cone-pulley to rotate in opposite directions while in motion. When the driving-belt is upon the pulley F and in motion, it transmits motion directly to the cone-pulley B; but when the belt is shifted to the pulley G it transmits motion first to the shaft A, and thence through the gears D E C to the cone-pulley in a reversed or backward direction.

This mode of combining the cone-pulley and the shaft constitutes a simple and easy means of reversing the movement of the pulley.

What I claim as my invention, and desire to secure by Letters Patent, is—

The combination of the loose cone-pulley with the shaft A, in the manner and for the purpose substantially as herein specified.

C. G. SHAW.

Witnesses:
L. W. LANGDON,
HORACE I. HODGES.